United States Patent
Khripunov et al.

(10) Patent No.: US 12,103,253 B2
(45) Date of Patent: Oct. 1, 2024

(54) HIGH INTENSITY LIGHT CURING FOR THREE-DIMENSIONAL PRINTING

(71) Applicant: Mighty Buildings, Inc., San Francisco, CA (US)

(72) Inventors: Sergey Khripunov, Moscow (RU); Evgeniy Kuznetsov, Moscow (RU); Igor Obach, Moscow (RU); Aleksei Dubov, San Mateo, CA (US); Anna Ivanova, Moscow (RU)

(73) Assignee: Mighty Buildings, Inc., Oakland, CA (US)

( * ) Notice: Subject to any disclaimer, the term of this patent is extended or adjusted under 35 U.S.C. 154(b) by 41 days.

(21) Appl. No.: 17/219,863

(22) Filed: Mar. 31, 2021

(65) Prior Publication Data
US 2022/0314561 A1    Oct. 6, 2022

(51) Int. Cl.
*B29C 71/04*    (2006.01)
*B29C 64/106*    (2017.01)
(Continued)

(52) U.S. Cl.
CPC ............ *B29C 71/04* (2013.01); *B29C 64/106* (2017.08); *B29C 64/209* (2017.08);
(Continued)

(58) Field of Classification Search
CPC ... B29C 64/106; B29C 64/112; B29C 64/118; B29C 64/205
See application file for complete search history.

(56) References Cited

U.S. PATENT DOCUMENTS 5,303,141 A * 4/1994 Batchelder ............. B33Y 70/10
156/244.11
9,522,426 B2    12/2016 Das et al.
(Continued)

FOREIGN PATENT DOCUMENTS

CN    106003715 A * 10/2016
CN    107813050 A *  3/2018 ......... B23K 26/0604
WO    WO-2019023789 A1 *  2/2019

OTHER PUBLICATIONS

Digital Light Lab, AccuCure 83x83 LED Curing Panel, 2019, https://www.digitallightlab.com/accucure-83x83-panel/ (Year: 2019).*
(Continued)

*Primary Examiner* — Timothy Kennedy
*Assistant Examiner* — Ariella Machness
(74) *Attorney, Agent, or Firm* — Cognition IP, P.C.; Edward Steakley; Justin White

(57) ABSTRACT

A 3D printing system can include an extruding system, curing system and feedback system. The extruding system can include a feed pipe coupled to a printing material source and a nozzle that extrudes a printed material. The feedback system can include a processor and sensors and can detect the temperature and location of the curing system during the printing process. The curing system cures the printed material after extrusion and includes curing sources coupled to a mounting arrangement, which can be a curved surface. The curing sources can each be directed toward a focal region located proximate the nozzle outlet and can combine to emit a combined curing energy to the focal region. The curing sources can be LEDs and the curing energy can be UV light. The curing system can rotate about an axis during printing and curing to facilitate rapid movement and printing of complex 3D objects.

25 Claims, 13 Drawing Sheets

(51) Int. Cl.
   *B29C 64/209* (2017.01)
   *B29C 64/241* (2017.01)
   *B29C 64/282* (2017.01)
   *B29C 64/393* (2017.01)
   *B33Y 10/00* (2015.01)
   *B33Y 30/00* (2015.01)
   *B33Y 40/20* (2020.01)
   *B33Y 50/02* (2015.01)

(52) U.S. Cl.
   CPC .......... *B29C 64/241* (2017.08); *B29C 64/282* (2017.08); *B29C 64/393* (2017.08); *B33Y 10/00* (2014.12); *B33Y 30/00* (2014.12); *B33Y 40/20* (2020.01); *B33Y 50/02* (2014.12)

(56) References Cited

U.S. PATENT DOCUMENTS

| | | | |
|---|---|---|---|
| 9,527,992 B2 | 12/2016 | Shulga et al. | |
| 2013/0134445 A1* | 5/2013 | Tarsa | G02B 19/0061 257/E33.059 |
| 2014/0265040 A1 | 9/2014 | Stratasys | |
| 2017/0246803 A1* | 8/2017 | Johnson | B29C 64/40 |
| 2018/0065299 A1* | 3/2018 | Tyler | B33Y 50/02 |
| 2018/0126637 A1* | 5/2018 | Tyler | B29C 64/118 |
| 2018/0311898 A1* | 11/2018 | Schwarzbaum | B29C 64/118 |
| 2019/0315048 A1 | 10/2019 | Sterman et al. | |
| 2020/0406554 A1* | 12/2020 | Belorustsev | B33Y 50/02 |
| 2021/0078254 A1* | 3/2021 | Indyk | B33Y 30/00 |
| 2021/0237355 A1* | 8/2021 | Cambron | B29C 64/118 |
| 2022/0009163 A1* | 1/2022 | Tyler | B22F 12/22 |

OTHER PUBLICATIONS

Digital Light Lab (https://www.digitallightlab.com/accucure-83x83-panel/) (Year: 2019).*

International Search Report in PCT International Application No. PCT/US2022/017385, mailed Jun. 21, 2022.

* cited by examiner

HIGH INTENSITY LIGHT CURING FOR THREE-DIMENSIONAL PRINTING

CROSS-REFERENCE TO RELATED APPLICATION

This application is related to U.S. patent application Ser. No. 17/219,866 filed on this same date of Mar. 31, 2021 and entitled "THREE-DIMENSIONAL PRINTING HEAD WITH ADJUSTABLE PRINTING ANGLE," which application is hereby incorporated by reference in its entirety herein.

TECHNICAL FIELD

The present disclosure relates generally to three-dimensional ("3D") printing, and more particularly to large-scale 3D printing using a moving printing head and curing system.

BACKGROUND

Recent advancements in additive manufacturing based on layer-by-layer 3D printing have resulted in custom design diversification, efficient manufacturing without a complex supply chain, low waste, and high automation, among other advantages. Such advancements include the use of a movable printing head within a 3D printing system, which can allow for automated 3D printing at relatively high speeds. Various curable polymers have been found to have good interlayer adhesion so as to provide great potential in large-scale construction 3D printing, particularly in the case of photocurable composite polymers. To create high quality 3D printed objects at desirably fast manufacturing speeds though, a well-developed, fast, and precise printing material curing process is needed.

Unfortunately, existing printing material curing processes are unable to meet the requirements for high-performance large-scale 3D printing, even when using photocured materials with favorable polymerization characteristics. For example, where ultraviolet ("UV") light is used to cure 3D printing materials, there are two commonly affordable types of UV light sources. Gas discharge lamps are largely unsuitable because of factors such as low power control ranges, low brightness due to low active gas densities, relatively large sizes, and significant indirect light emissions. Light emitting diodes ("LEDs") are better, but still have issues with insufficient amounts of curing energy for single LEDs and inefficient distribution and diffusion of light when multiple LEDs are used. Furthermore, the use of multiple LEDs can result in bulky space consuming arrangements that limit the printing of complex 3D objects.

Although traditional ways of curing 3D printed materials have worked well in the past, improvements are always helpful. In particular, what is desired are 3D printing systems that provide faster curing of printed material at higher controlled curing intensities, as well as the ability to move and rotate the curing components, which in turn allows for more flexibility in the types of 3D objects having complex geometries that can be printed, as well as the speeds at which such 3D objects can be printed.

SUMMARY

It is an advantage of the present disclosure to provide 3D printing systems that provide faster curing of printed material at higher controlled curing intensities, as well as the flexibility to print complex 3D objects. The disclosed features, apparatuses, systems, and methods provide improved 3D printing solutions that include a curing system that quickly and efficiently cures 3D printed material after the printed material has been extruded from a printing nozzle outlet, with the curing system being arranged into a compact and movable space that can be readily moved and rotated as needed during a continuous 3D printing process. These advantages can be accomplished in multiple ways, such as by including a plurality of curing sources that combine to emit curing energy toward a focal region located proximate the nozzle outlet, as well as a mounting arrangement that fixes the direction of curing energy from each curing source toward the focal region, and a curing system carriage or housing that arranges the curing sources into a compact arrangement that can be readily moved and rotated as needed.

In various embodiments of the present disclosure, a 3D printing system can include an extruding system, a curing system, and a feedback system. The extruding system can include a feed pipe coupled to a printing material source and a nozzle coupled to the feed pipe, and the nozzle can extrude a printed material at a nozzle outlet during a printing process. The curing system can cure the printed material after the printed material has been extruded from the nozzle outlet, and the curing system can include a plurality of curing sources coupled to a mounting arrangement. The plurality of curing sources can combine to emit a total curing energy toward a focal region located proximate the nozzle outlet. The feedback system can include at least a processor and one or more sensors, and the feedback system can be configured to detect the location of the curing system with respect to at least a portion of a 3D printed object during the printing process.

In various detailed embodiments, the mounting arrangement can include a curved surface, which can be spherical, and each of the plurality of curing sources can be mounted to the curved surface such that the curing energy from each curing source is directed toward the focal region. The 3D printing system can be configured to use location data provided by the feedback system to prevent the curing system from colliding with the 3D printed object or any other object during the printing process. The feedback system can include a camera configured to provide an image of the 3D printed object within the focal region, a thermal imaging camera configured to provide a temperature distribution image of the 3D printed object within the focal region, or both. Each of the plurality of curing sources can be positioned at a different angle with respect to the focal region. The plurality of curing sources can include at least 40 curing sources, and the overall dimensions of such a curing system can be within 250 mm×180 mm×140 mm.

In various detailed arrangements, the curing energy can be light, such as UV light, and the plurality of curing sources can be light emitting diodes. The intensity of at least a portion of the curing sources can be adjustable. The curing system can also include an outer housing coupled to the curved surface and surrounding the outer sides of the plurality of curing sources, and this outer housing can form a C-shape around a central axis that extends through the focal region. The curing system can be configured to rotate about the central axis during the printing process to improve curing of the extruded printing material based on a movement direction of the 3D printing system. The curing system can further include a cooling system including a heat sink, one or more fans, or both, as well as a temperature sensor configured to monitor the temperature of the curing system.

In various arrangements, the size of the focal region can be about the same as the size of an extrusion width of the printed material.

In various further embodiments of the present disclosure, a curing system configured to cure extruded printed material during a 3D printing process can include an outer housing, a mounting arrangement coupled to a rear portion of the outer housing, and a plurality of curing sources contained laterally within the outer housing and coupled to the mounting arrangement such that each of the plurality of curing sources is angled toward a focal region located proximate a nozzle of an overall 3D printing system. The mounting arrangement can include a curved surface, and the plurality of curing sources can combine to emit a total curing energy toward the focal region. Again, the curing energy can be light, the plurality of curing sources can be light emitting diodes, and the outer housing can form a C-shape around a central axis that extends through the focal region. The curing system can be configured to rotate about the central axis during the 3D printing process, and the curing system can be configured to have its rotational movement controlled by the overall 3D printing system based on its relative location with respect to a 3D printed object being printed by the overall 3D printing system in order to prevent collisions between the curing system and any other object. The curing system can also include a cooling system including a heat sink, one or more fans, or both.

In still further embodiments of the present disclosure, various methods of 3D printing a 3D printed object are provided. Pertinent process steps can include supplying a printing material through a feed pipe to a nozzle located at a 3D printing system, the nozzle having an extrusion opening, extruding the printing material from the extrusion opening of the nozzle, moving the nozzle laterally while the printing material is being extruded from the nozzle to form a layer of the printing material, and curing the printing material using a curing system after the printing material has been extruded from the nozzle to form the layer of printing material. Curing the printing material can include directing curing energy from a plurality of curing sources arranged such that each curing source is a similar distance from a focal region located proximate the extrusion opening and is angled such that its respective curing energy is emitted directly toward the focal region.

Additional process steps can include rotating an orientation of the curing system while curing the printing material, as well as adjusting an intensity of the curing system while curing the printing material. Another process step can involve obtaining temperature data from a thermal imaging camera or temperature sensor of a feedback system, wherein the adjusting an intensity of the curing system is based on the obtained temperature data. Another process step can involve obtaining location data regarding the curing system from a feedback system, wherein the rotating an orientation of the curing system is based on the obtained location data to prevent collisions of the curing system with the 3D printed object. In various arrangements, some or all steps can be performed simultaneously.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, systems and methods for 3D printing using an adjustable high intensity curing system. These drawings in no way limit any changes in form and detail that may be made to the disclosure by one skilled in the art without departing from the spirit and scope of the disclosure.

DETAILED DESCRIPTION

Figure 1:
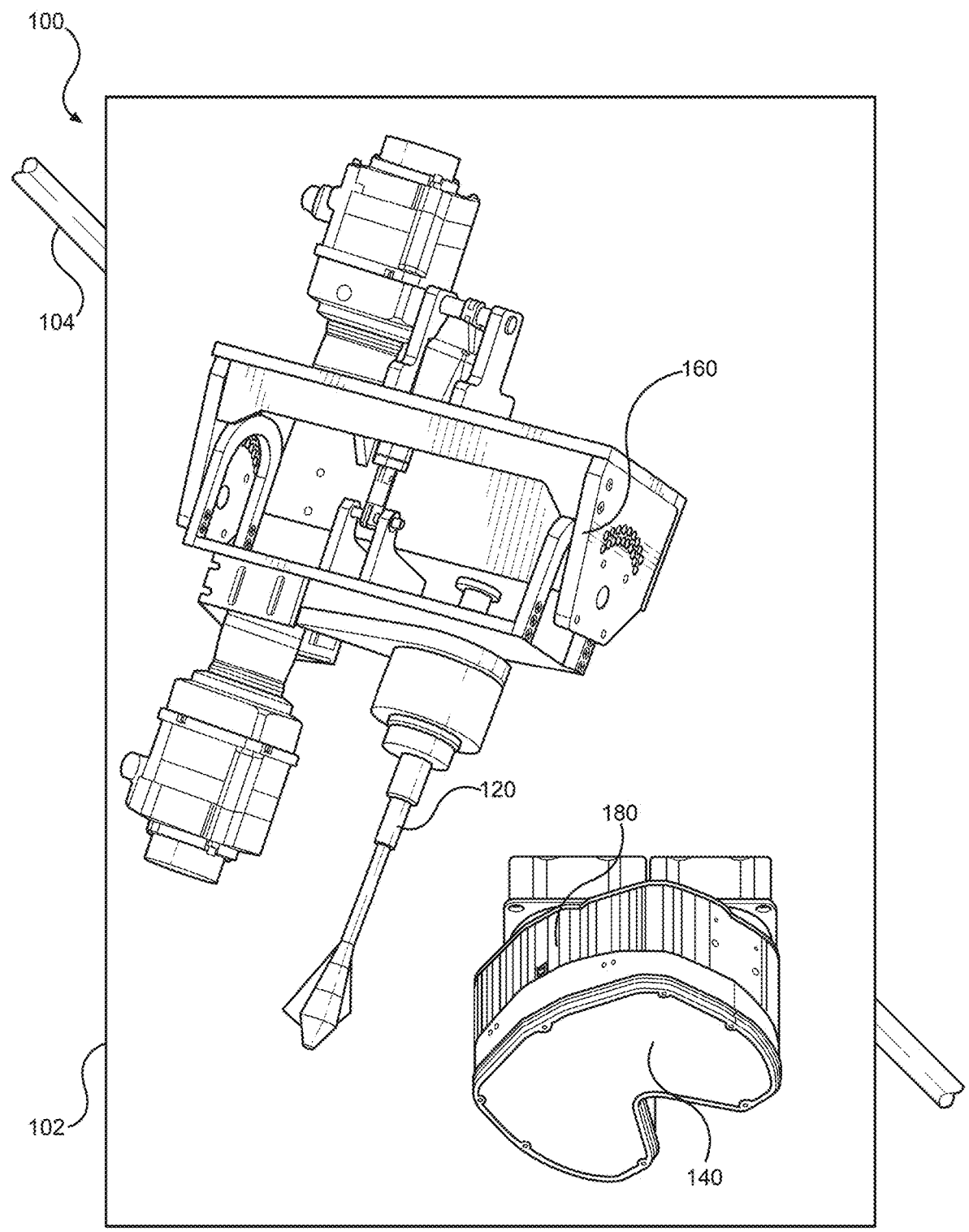
FIG. 1 illustrates in front perspective view an example 3D printing system according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for 3D printing using a rapid and flexible high intensity curing system that facilitates the rapid creation of complex 3D printed objects. The disclosed embodiments can include specialized 3D printing systems and specialized curing systems for those printing systems, as well as methods of using the specialized 3D printing and curing systems. In particular, the disclosed embodiments can involve the use a curing system having multiple curing sources that are coordinated to focus their combined curing energies upon a relatively small focal region, as well as a curing system that can have its rotational orientation adjusted and its curing intensity adjusted during the 3D printing process.

In various embodiments, the disclosed curing systems can involve the use of UV lights as the curing sources and UV light as the curing energy. It will be understood, however, that the disclosed curing systems could alternatively use other types of light or curing sources and other forms of curing energies. For example, heat, chemical reactive processes, or light outside the UV spectrum could be used to cure printing material, with components for providing such alternative curing sources and curing energies being arranged and controlled in a manner similar to those disclosed herein for the example UV light curing sources and curing energies.

With respect to the example UV light curing sources and energies disclosed herein, UV light dosage is a significant parameter that influences photocurable material solidification and final performance of a 3D printed part. Light dosage is the intensity of the light multiplied by the exposure time. By adjusting the UV light intensities, desirable printing speeds and results can be achieved for a given set of printing parameters. The UV light dosage of each single portion of a 3D printed part can be carefully controlled in order to achieve progressively the required amount of curing of a printing material being used. In various arrangements, multiple passes of a curing system can be used to finely control the printing and curing of complex 3D printed objects. Moreover, different parts of various 3D printed objects can absorb light from different passes of the curing system, such that a curing system having multiple UV light sources with a wide range of variable powers and intensities can be used.

The power of modern UV LEDs can be easily controlled by supply current over a wide range. Moreover, UV LEDs can have a high brightness of up to 20 watts per centimeter squared, which can allow for increased light powers of up to hundreds of watts for a collection of UV LEDs in a compact space. In addition, the energy conversion efficiency of UV LEDs is relatively high and can be about 50%, which results in lower power consumption by the same level of light power in comparison with other curing sources. UV LEDs also have a narrow optical spectrum (i.e., less than 15 nm width), which provides high polymerization efficiency by delivering all light power at a highly absorbing wavelength. While the irradiation of LED lamps goes in all directions, the light from LEDs has a direct distribution, with an angle divergence from about 50-150 degrees. Accordingly, the use of UV LEDs has been found to be highly suitable for the various curing systems disclosed herein.

3D printing of a UV curable composite can be performed through solidification of an extruded photocurable material that can be several centimeters in width. It is thus preferable to focus curing UV light to a spot or "focal region" having a diameter that is approximately equal to the extrusion width of the printing material as it is extruded from a nozzle or other printing component. Since a single LED does not provide a strong enough light and an array of LEDs does not provide a combined light that is focused enough to satisfy the desired curing power, the disclosed embodiments provide several features to overcome these issues. In particular, each individual LED in the disclosed curing system can have a focusing arrangement designed to decrease its light divergence, and all LEDs can be arranged such that their emitted light is all directed toward the same focal region. This can be accomplished, for example, by mounting or otherwise coupling the LEDs onto a curved surface so that the light beams from all LEDs are focused toward the same spot or focal region.

In addition, the overall curing system can form a unique shape to collect a plurality of curing sources (e.g., LEDs) into a compact space that is both laterally movable and rotatable, which can facilitate rapid horizontal layer-to-layer 3D printing and curing, as well as allowing for non-horizontal 3D printing at an angle (i.e., sliced at an angle to vertical).

In various embodiments, the disclosed 3D printing and curing systems can be utilized in the building industry for printing houses and various parts thereof, such as walls, wall panels, roofs, floors, and the like. A printing head of the 3D printing system can deposit printed layers within each of the XY, YZ, XZ planes and any combination thereof, as well as planes that are spherical and angular to these and other planes. The ability to change the intensity and rotational orientation of the curing system during the 3D printing process makes it possible to rapidly print and cure printed material for hinged structures, such as ceilings and floors, for example, to print and cure layers onto any surfaces with or without obstacles, such as printing on a frame or printing around a beam, for example, and also to print and cure objects with complex geometric shapes and configurations, such as hyperboloids.

The many advantages provided by the disclosed embodiments enable unique manufacturing methods of 3D printing to produce building structures from floors to ceilings, to print around structural frames of buildings, to print complex infill portions of building structures or building components, and to print lightweight and durable complex structures, such as hyperboloid structures. Rapidly curing printing material just after it is extruded or "printed" can allow for faster layer on layer printing. Such rapid curing is facilitated by a unique arrangement of multiple curing sources (e.g., UV LEDs) that all have their curing energies directed toward the same focal region, as well as a unique shape of the collective arrangement, which can allow for lateral and rotational movement of the entire curing system as needed to quickly print and cure the printed layers forming complex 3D objects. These and other advantages provide significant improvements over traditional 3D printing processes of buildings and the parts of thereof in terms of efficiency, labor cost reduction, high quality and preciseness in automation levels, and the variety of the designs may be printed utilizing the disclosed technologies.

Features of the disclosed embodiments include an extruding system, a curing system, a positioning system, and a feedback system, each of which has its own unique and advantageous components. The extruding system can include a portioned or sectioned feed pipe as well as a nozzle that extrudes printing material at a printing angle that can be adjusted during the printing process. The curing system can include curing components that can focus light or other curing media at an angle that can be adjusted in correlation with the printing angle of the nozzle. The positioning system can include a platform to which the extruding system is mounted as well as a platform rotating subsystem that can rotate the platform to adjust the printing angle of the extruding system as well as the curing angle of the curing system. The feedback system can include a processor, one or more sensors, and one or more cameras that can combine to detect the position of the various 3D printing system components and the curing levels of the curing system and are able to adjust the automated printing process accordingly.

Although various embodiments disclosed herein discuss 3D printing with respect to buildings and building components, it will be readily appreciated that the disclosed features, apparatuses, systems, and methods can similarly be used for any relevant type of 3D printing and any 3D printed object. For example, the disclosed system and methods can be used to 3D print models, figures, and other items that are not for use in building construction. Other applications, arrangements, and extrapolations beyond the illustrated embodiments are also contemplated.

Referring first to FIG. 1, an example 3D printing system is illustrated in front perspective view. 3D printing system 100 can include an extruding system 120, a curing system 140, a positioning system 160, and a feedback system 180. In some embodiments, each of these components can be included in a movable printing head 102 that can be coupled to a gantry system 104. The gantry system 104 can be constructed to allow the printing head 102 to be moved in a variety of directions during a 3D printing process, as will be readily appreciated by those of skill in the art. In various embodiments, some components of these systems may be located elsewhere from the movable printing head 102. For example, one or more processors of the feedback system 180 may be located outside the printing head 102.

Extruding system 120 can include various subsystems and components that provide a supply of printing material from a feeding hose to a nozzle where the material is then printed. Curing system 140 can be an optical curing system, for example, and can include various subsystems and components that provide curing of the printed material. In some embodiments, the printed material can be a light-activated material and the curing components can focus light at one or more wavelengths between 200 and 1000 nm on the light-activated material to solidify the printed material during 3D printing operations. The exact wavelength can depend on the exact printing polymer or other material used, as will be readily appreciated. Positioning system 160 can include various subsystems and components that provide desired directions and orientations relating to X, Y, and Z axes for the extruding system 120 and/or the curing system 140 during 3D printing operations. Feedback system 180 can include various subsystems and components that provide precise and comprehensive information to allow the other systems to operate and interact cohesively during 3D printing operations, which can be fully automated.

An applicable extruding system can include various components, such as, but not limited to, a source coupler, a feed pipe first segment, a feed pipe second segment, a nozzle, a nozzle coupler, and a protective skirt, among other possible components. The source coupler can provide a proper connection between a printing material source of the 3D printing system and the feed pipe, which can include first and second segments, one or both of which can be removable and replaceable from the overall extruding system. The nozzle can be coupled to the end of the feed pipe to extrude printing material that has come from the printing material source and passed through the feed pipe. In various arrangements, the nozzle can be chemically resistant to the printing material and any other materials that form the printing material and can also be and resistant to the effects of the curing system, such as by being irradiation resistant to light or other curing energy emitted from a curing system. The nozzle can have a longitudinal axis along which printing material is extruded at a printing angle during a printing process to form at least a portion of a 3D printed object. The protective skirt can be located about an extrusion opening of nozzle to avoid printing material curing directly at the nozzle immediately upon extrusion. In particular, the protective skirt can shield printing material as it is being extruded from a curing system, which may be coupled to the printing head such that it follows the movement of the nozzle during the 3D printing process. Further details of 3D printing using a printing head with an adjustable printing angle are provided in U.S. patent application Ser. No. 17/219,866, entitled "THREE-DIMENSIONAL PRINTING HEAD WITH ADJUSTABLE PRINTING ANGLE," which application is hereby incorporated by reference in its entirety herein.

In various embodiments, a curing system can be used to cure the printing material after it is extruded from the nozzle and has exited a shielding region provided by protective skirt. Such a curing system can be an optical curing system, although other types of printing material curing can also be used, such as, for example, heat or chemical reaction curing systems. An optical curing system may include a plurality of light sources of any suitable type, such as, for example, LEDs. Any type of LEDs, such as laser diodes, can be used, and the number of LEDs may be variable between 2 and 10,000 or more. For better curing of the layer of printing material the number of light sources may be increased. The light emitting subsystem may also include a plurality of light sources presented by laser emitters installed on at least one electronic unit. As noted above, UV LEDs have been found to be particularly effective, although it will be understood that other types of LEDs may also be used.

In various arrangements, the light sources may be combined into modules for better light curing performance. The number of light source modules can vary and may depend on the desired 3D printing parameters for a given application. For example, in the event that a rapidly polymerized composite is used in the printing material it may be sufficient to have only one light source module curing a deposited printing material layer from the top. Conversely, where a slowly polymerizable composite is used in the printing material, it may be useful to post-cure a printed layer even after deposition using one or more additional modules. Such additional light source module(s) can be located at an angle to the nozzle. In this manner, post-curing through layers can be performed every time the printing head returns to and passes over the exact same point the next time as it deposits printed material layers atop each other.

To improve the efficiency of the photopolymerization process, a suitable 3D printing optical curing system can include two connected and coordinated subsystems: a light emitting subsystem to perform light curing of the photopolymerizable material and a light focusing subsystem to focus the light emitted by the light emitting subsystem. The light focusing subsystem may be used for printing complex structures or objects when it may be desirable to adjust light output direction in order to arrange the light curing of the 3D printed layers in such a way that every part of a complex 3D printed structure or object can have an equal light curing exposing period and light power.

In various arrangements, wavelengths of the curing light sources can be varied between about 200 nm and 1000 nm, although other ranges are possible, and the various curing light sources can allow for a wide range of chemical systems in order to print a structure or object with precise desired properties that are particular to the structure or object type, such as, for example, a ceiling, floor, interior wall, exterior wall, infill region, curved region, or any portion thereof. Having multiple different light sources or curing modules with multiple light sources within one curing system can allow the quality of the 3D printed structure to be controlled depending on the desired 3D printing parameters. Use of a light focusing subsystem can allow light power to be concentrated at varying levels at the layer deposition spot, thus increasing the efficiency of the process and the printing speed.

Figure 2:
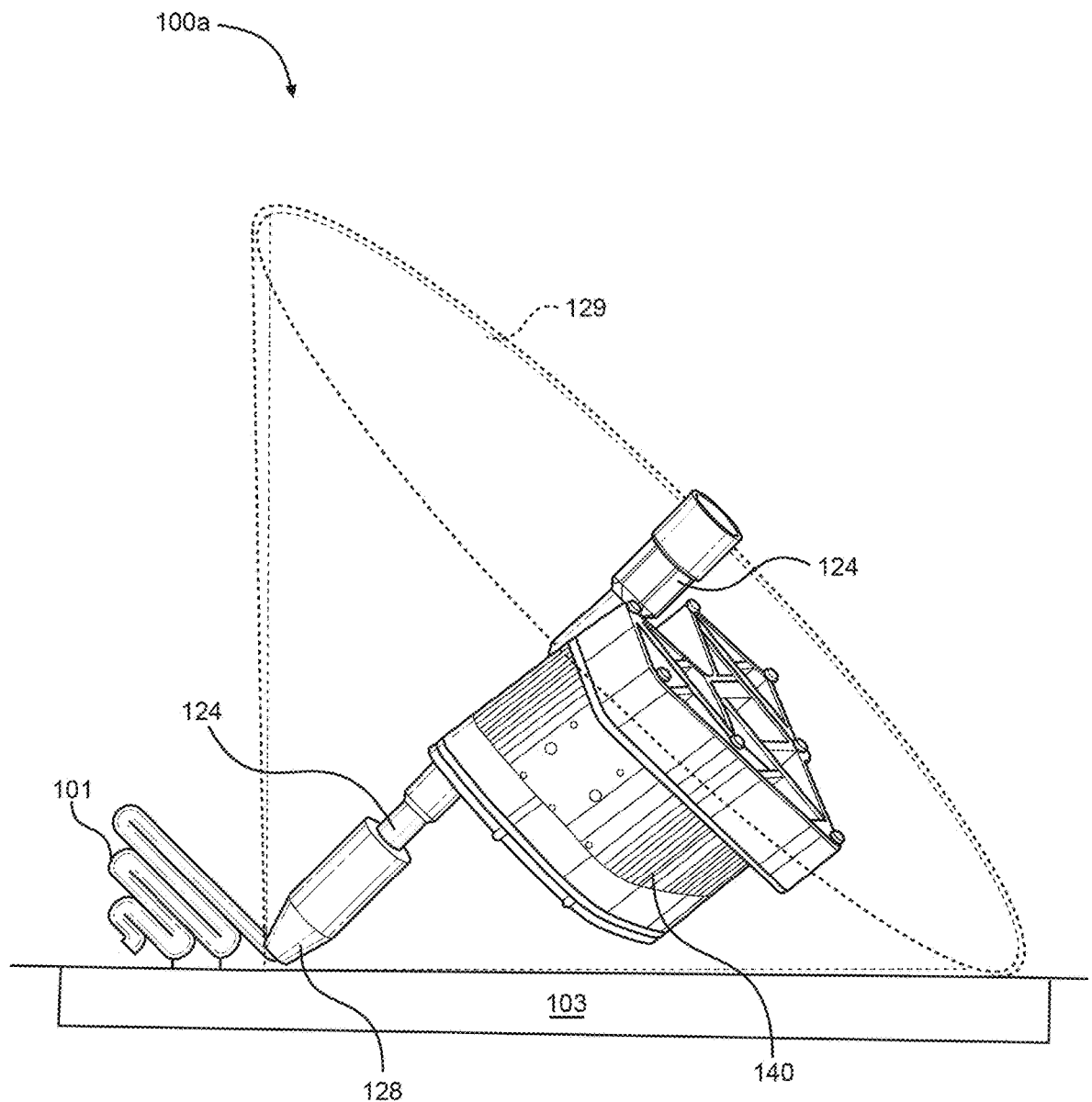
FIG. 2 illustrates in side perspective view an example feed pipe, nozzle, and curing system of a 3D printing system according to one embodiment of the present disclosure.

FIG. 2 illustrates in side perspective view an example feed pipe, nozzle, and curing system of a 3D printing system according to one embodiment of the present disclosure. Feed pipe 124 can feed printing material to nozzle 128, which then prints the printing material in layers 101 at a printing table 103 or other suitable boundary, as will be readily appreciated. Curing system 140 can be positioned about feed pipe 124 such that the curing energy (e.g., UV light) can be directed toward a focal region located proximate the outlet of the nozzle 128. Curing system 140 can also be part of an overall printing head, such that curing system 140 moves with the feed pipe 124 and nozzle 128 as these components move during printing.

Among the advantages described above, the disclosed curing system can be used as part of an overall 3D printing system used to print printing material at an adjustable angle in automated fashion. Printing at an adjustable angle allows for the rapid and continuous printing of complex curve shaped structures as well as hinged structures (e.g., ceilings, floors, etc.). Printing at an adjustable angle can also impose additional requirements on the curing system. For example, where the curing system is advantageously located at or about a moving printing head of a 3D printer, the curing system cannot be overly large or bulky so that it unduly limits printing head movements. The curing system should thus have a shape and form restricted by an available area between the nozzle 128 and printing table 103.

Accordingly, curing system 140 can have a unique shape that allows multiple curing sources (e.g., UV LEDs) to be compacted into a relatively small space. Such a unique shape can be a C-shape, for example, further details of which are provided below with respect to FIGS. 5-7 and the accompanying written description. In addition to having a C-shape or other shape that compacts the curing system 140 about the feed pipe 124 and nozzle 128 such that these components all move laterally together during printing, curing system 140 can also be configured to rotate about an axis at or proximate the feed pipe 124 and nozzle 128. As such, all components of curing system 140 can rotate as an entire unit around an axis defined by the nozzle and feed pipe while also following the printing head moving path during printing. For example, the range of rotation and clearance space required for a rotating curing system 140 can be represented by cone 129 in FIG. 2, with the cone apex located at the nozzle outlet. The shape and rotational ability of curing system 140 can allow for adjustments to the printing angle during continuous printing while also allowing the curing system 140 (and all of the printing head) to avoid printed materials and other objects during printing.

Figure 3:
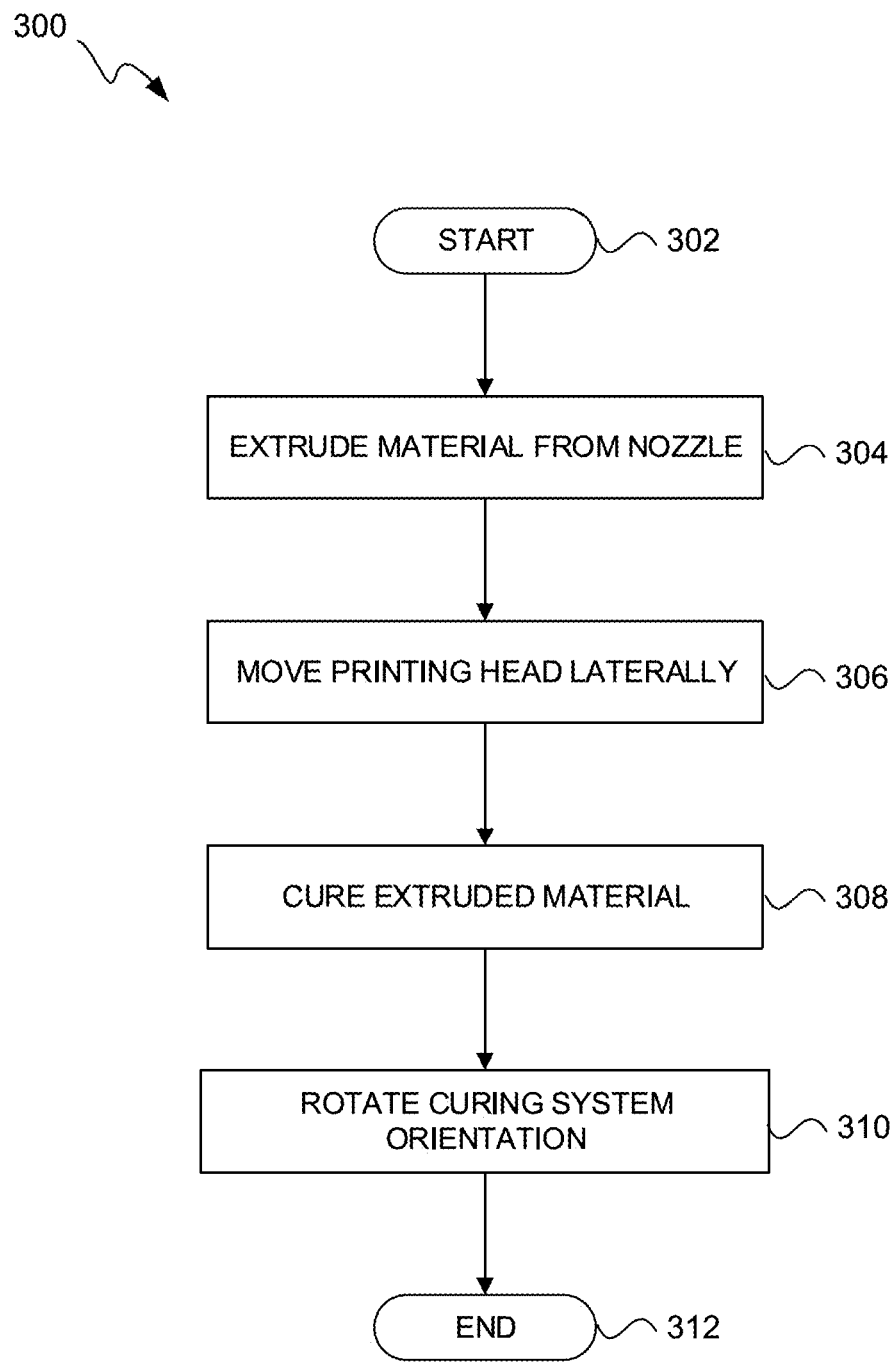
FIG. 3 illustrates a flowchart of an example method of 3D printing involving an adjustable curing system according to one embodiment of the present disclosure.

Turning next to FIG. 3, a flowchart of an example method of 3D printing involving an adjustable high intensity curing system is provided. It will be readily appreciated that method 300 can be a high level method and that one or more steps can be omitted and/or other steps can be added. For example, the step of adjusting a printing angle during the 3D printing process can be included. Furthermore, various steps can be performed in a different order and some steps can be performed simultaneously. For example, all of steps 304-310 can be performed simultaneously during a continuous 3D printing process. Further detailed steps and description are provided below with respect to the detailed method set forth in FIG. 13.

After a start step 302, a first process step 304 can involve extruding printing material from a nozzle. This can include feeding the printing material from a printing material source to a printing head and then extruding the printing material from a nozzle located at the printing head.

At the next process step 306, a printing head can be moved laterally. This can involve movement of the nozzle, which is mounted or otherwise coupled to the printing head, such that moving the printing head moves the nozzle. Movement can be in or more of the XY, YZ, and XZ planes alone or in any combination. Moving the printing head may also move the curing system in some arrangements, such as where the curing system is coupled thereto.

At the next process step 308, the extruded printing material can be cured. This can involve optical curing, heat curing, or any other suitable printing material curing technique. In various arrangements, the printing material can be cured shortly after it is extruded from the nozzle. For example, a curing system can be arranged at the printing head such that it follows the nozzle and cures printing material right after the printing material is extruded from the nozzle. A shielding arrangement at the nozzle can prevent the curing of printing material on the nozzle itself, such that curing only takes place immediately after the nozzle have moved away from the freshly extruded printing material.

At the next process step 310, the curing system orientation can be rotated. This can result in altering the rotational position of the curing system such that the curing system does not contact the object being printed or any other obstruction. Again, all steps can be performed simultaneously and in automated fashion, such that curing takes place on previously extruded printing material while new printing material continues to be extruded from the nozzle. Rotating the curing system can also take place while extruding printing material, moving the printing head, and curing extruded printing material, such as where the overall system knows or detects that the current rotational position of the curing system can be an issue with respect to potential objects in its current path of movement. Continuing the process can also allow for continuous printing before, during, and after the curing system orientation has been rotated. Accordingly, all steps may be repeated as long as desired until the 3D printing of a building, building component, or other object is completed, or until a desired stage is finished. The method then ends at end step 212.

Figure 4:
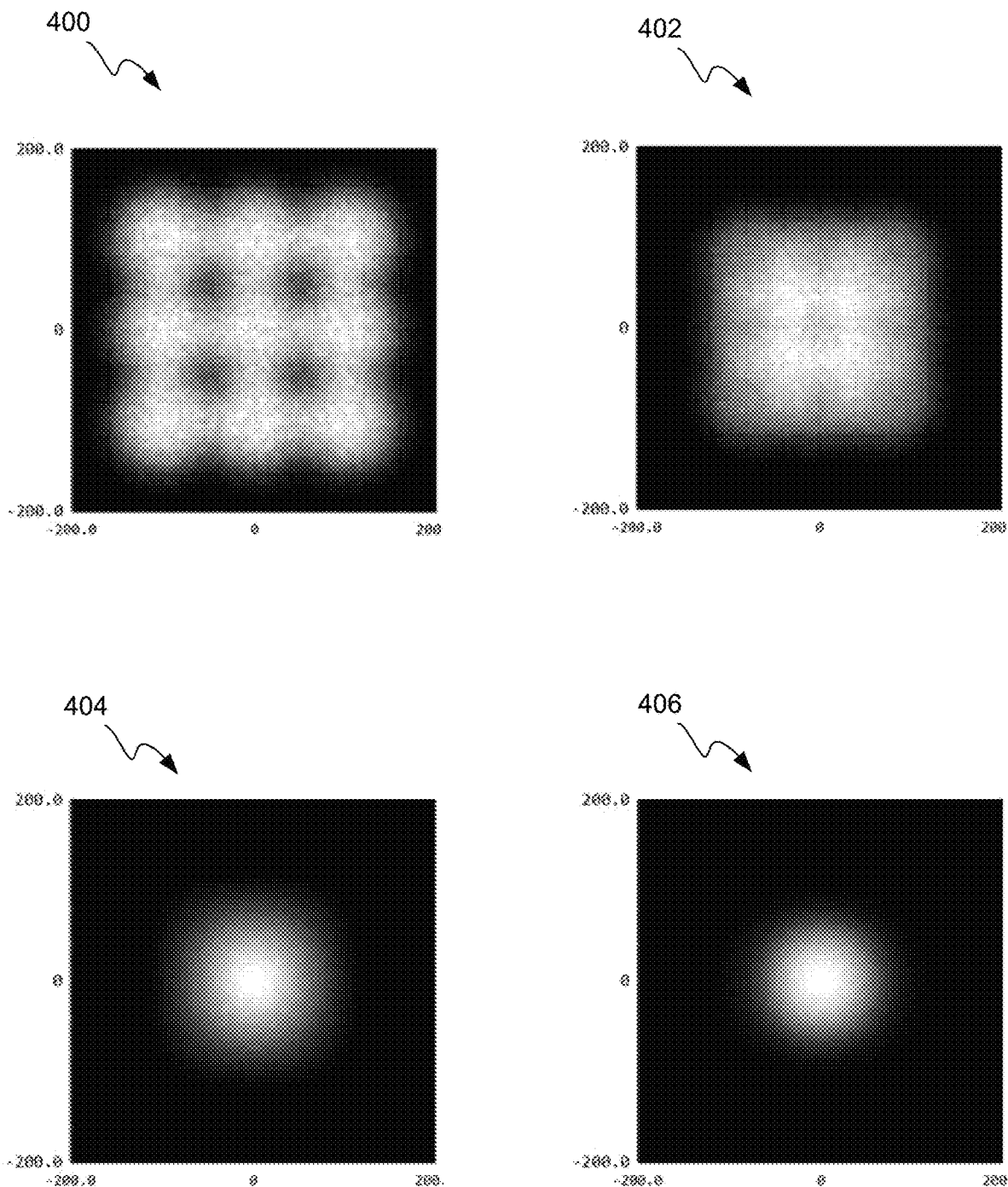
FIG. 4 illustrates a series of light distributions from nine separate light sources mounted to surfaces with varying curvature radii.

Transitioning now to FIG. 4 series of light distributions from nine separate light sources mounted to surfaces with varying curvature radii is illustrated. While the unique shape, compact nature, and rotational ability of the curing system disclosed provides many advantages to the overall 3D printing system, there can still be issues with using multiple curing sources (e.g., UV LEDs) that distribute curing energy (e.g., UV light) over too broad a region to be effective for quickly curing printed material. Light distribution images 400, 402, 404, and 406 illustrate the influence of a curved surface on focusing the light based on the light from nine separate light sources (i.e., curing sources). Images 400-406 show light distributions obtained by a numerical simulation in a printing plane that is 200 mm away from the light sources.

Image 400 depicts a light distribution that corresponds to placing nine light sources on a flat surface at a distance of 100 mm from each other. As can be seen, the light distribution is spread across too large an area to be effective in curing a small amount of printing material quickly. Image 402 corresponds to placing the nine light sources on a curved surface with a curvature radius of about 575 mm, which results in a more condensed light distribution. Image 404 corresponds placing the nine light sources on a curved surface having a curvature radius of about 292 mm, resulting in a smaller light spot on a prospective printing plane. Image 406 corresponds to placing the nine light sources on a curved surface having a surface curvature radius of about 200 mm, which results in a very small light spot when the light beams are directed to the same point or "focal region" in a prospective printing plane.

This approach can then be used in curing systems of the present disclosure, such that curing sources (e.g., UV LEDs) can be mounted to or otherwise placed on a curved surface with a curvature radius equal to a distance to the printing plane to focus the curing energy from all curing sources to a single focal region with a diameter of about several centimeters, for example. As a result, the disclosed curing systems can provide a wide range of curing power (e.g., up to 200 W) and curing intensities (e.g., 0.1 to 2.5 W/cm$^2$) at such a focal region, which is sufficient to result in high performance 3D printing and curing at rapid speeds.

Figure 5:
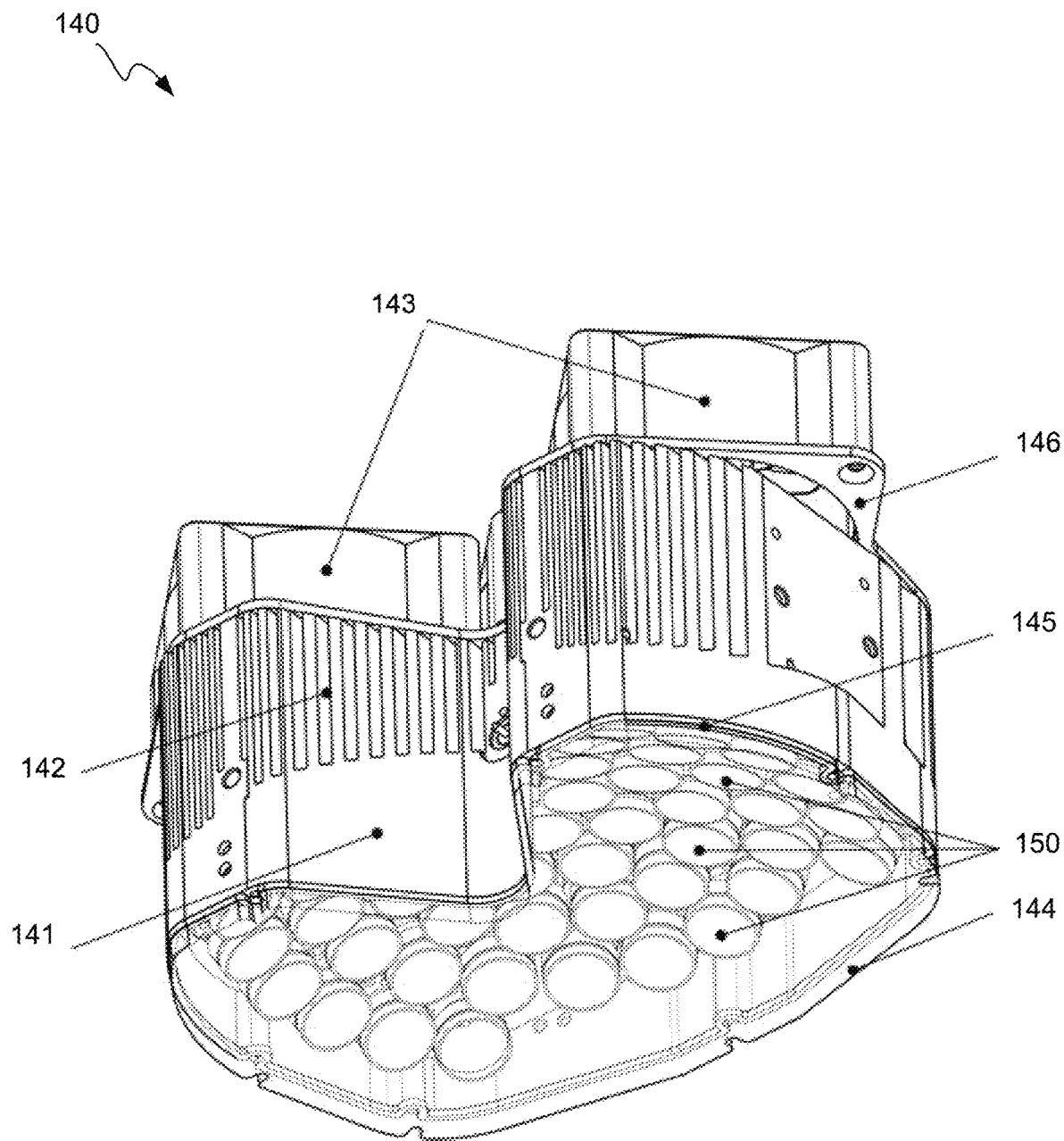
FIG. 5 illustrates in bottom perspective view an example curing system according to one embodiment of the present disclosure.

Continuing with FIG. 5, an example curing system according to one embodiment of the present disclosure is shown in bottom perspective view. Curing system 140 can be a high intensity curing system that includes an outer housing 141 surrounding a plurality of curing sources 150. As noted above, outer housing 141 can be C-shaped around an outer circumference while curing sources 150 can be UV LEDs, for example. Each of curing sources 150 can be mounted or otherwise coupled to a curved surface (shown in FIGS. 6, 8, and 9), such that they are all pointed toward a focal region (as shown in FIG. 7). Curing system 140 can also include a heatsink 142, one or more fans 143, a cover glass 144, a gasket 145, and a base plate 146, among other various components.

Figure 6:
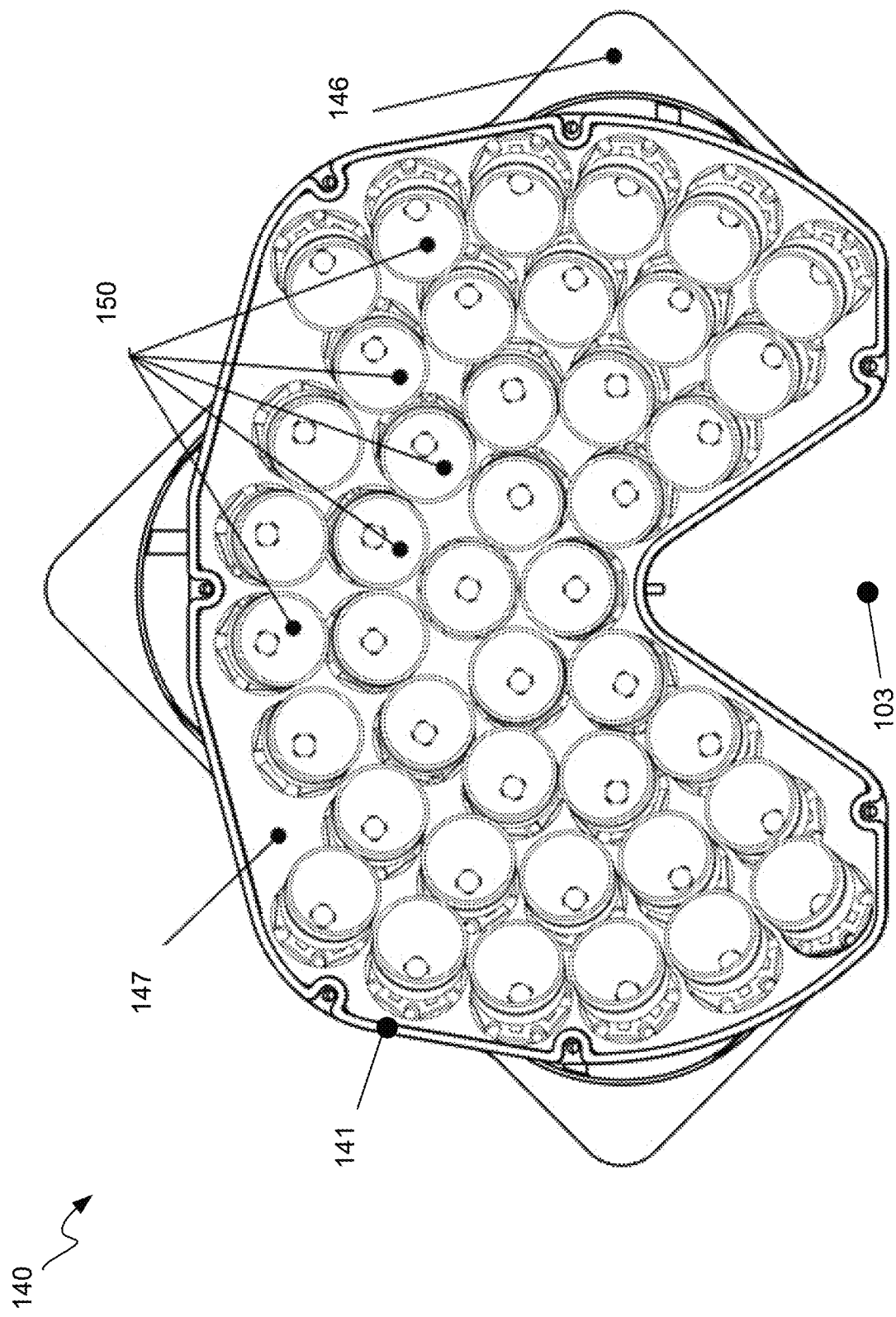
FIG. 6 illustrates in bottom plan view the example curing system of FIG. 5 according to one embodiment of the present disclosure.
Figure 7:
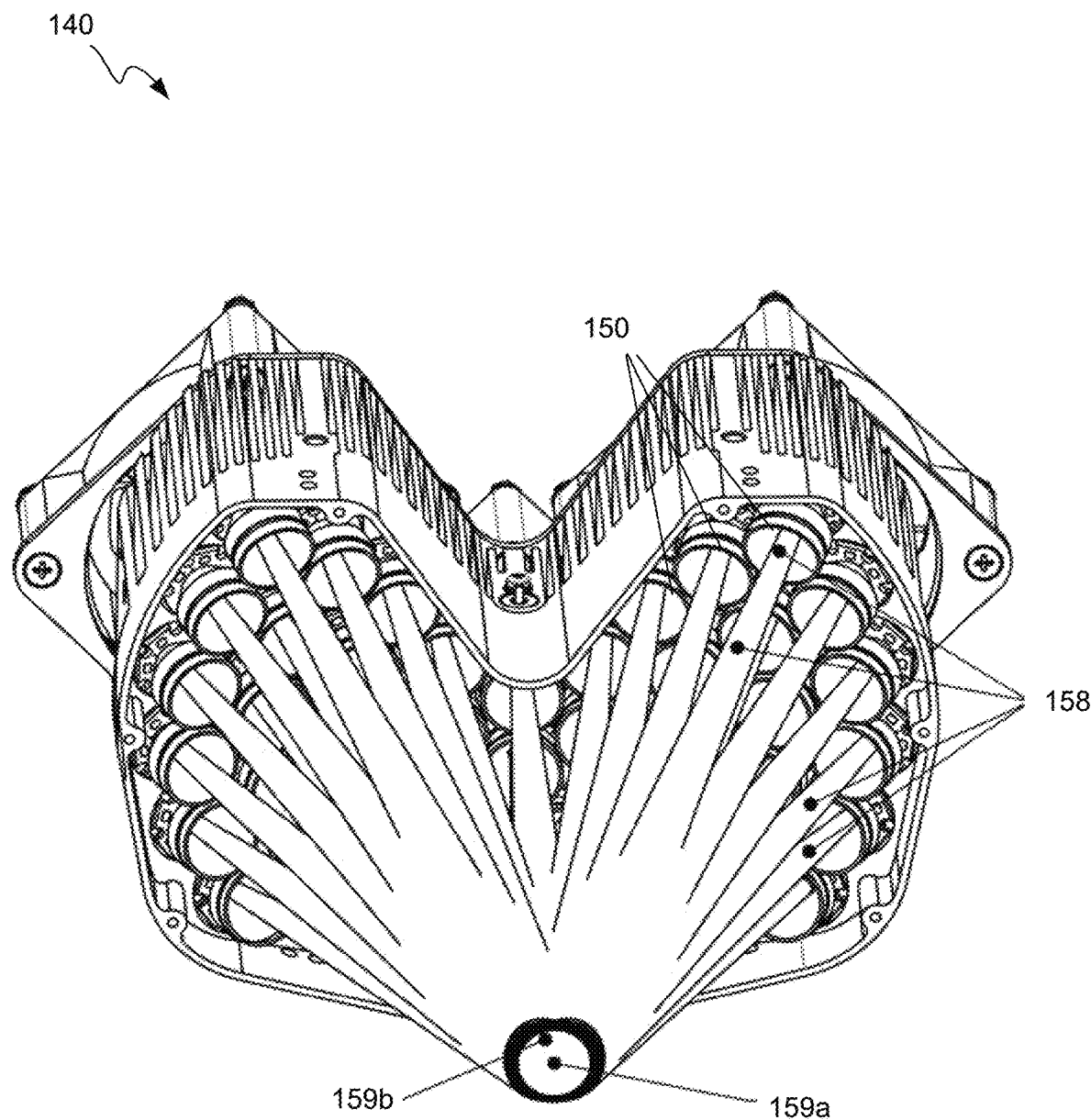
FIG. 7 illustrates in bottom perspective view an example light propagation of the example curing system of FIG. 5 according to one embodiment of the present disclosure.

FIG. 6 illustrates in bottom plan view the example curing system of FIG. 5. Curing sources 150 can be mounted or otherwise coupled to curved surface 147, which can in turn be coupled or otherwise mounted to base plate 146. Curing sources 150 and curved surface 147 can also be contained around an outer circumference by outer housing 141. Again, outer housing 141 can be C-shaped, such that all of the curing sources 150 can be contained within a compact space that can also be rotated about an axis. For example, rotation of curing system 140 can be about an axis perpendicular to the plane of FIG. 6 and extending through point 103. In various embodiments, the focal region can be located along this same axis. As noted above, any number of curing sources 150 can be used, such as, for example, 2-1000 curing sources. In this disclosed embodiment of curing system 140 for purposes of illustration, forty-two UV LEDs can be used as curing sources 150. More or fewer LEDs can be effectively used, and alternative collective shapes or arrangements can be formed with these LEDs and/or other curing sources.

In various arrangements, the back side of each of the UV LEDs or other curing sources 150 can be mounted to curved surface 147 such that each curing source 150 is pointed directly at the same focal region. Curved surface can be spherical or close to spherical in nature, such that the distance between each curing source 150 and the focal region is the same or about the same. In alternative arrangements, other coupling or mounting components can be used to orient some or all of the individual curing sources 150 such that they point toward the same focal region. For example, a fixed suspension lattice can be used to hold all of the curing sources 150 in place at a desired fixed angle and fixed distance from a given focal region.

Continuing with FIG. 7, an example light propagation of the example curing system of FIG. 5 is illustrated in bottom perspective view. Curing system 140 is depicted in operation here, such that UV light (i.e., curing energy) is emitted from each of the various UV LEDs. As shown, UV light beams 158 extend from each UV LED 150, which are all oriented to result in the light beams 158 converging on a focal point 159a. This focal point 159a can be an intersection of all light beams 158, which can coincide with a sphere center when the curved surface to which the LEDs are mounted is spherical. In some arrangements, the divergence of each light beam 158 from a typical UV LED can range from about 50-150 degrees. Light beam divergence can be reduced to about 8-30 degrees, however, through use of parabolic reflectors or other focusing arrangements in each UV LED, as noted below.

For purposes of illustration, the divergence of each light beam can ordinarily be about 135 degrees, which divergence can be narrowed to about 20 degrees after application of the focusing arrangements. Every UV LED (i.e., curing source) can be mounted on a curved surface or otherwise positioned and oriented close to other UV LEDs, with all UV LEDs emitting UV light to the same focal point 152. With each UV LED having a reduced light beam divergence, most or all of the UV light from all UV LEDs is projected onto a relatively small focal region 159b. The light intensity (e.g., curing energy) is combined to provide a total light intensity of more 2.5 W/cm$^2$ and a total light power about 200 W, which is all contained within the small focal region 159b. In various embodiments, this focal region 159b can be proximate the nozzle outlet of the overall 3D printing system, such as just after the nozzle designed outlet accounting for the lateral directional movement of the printing head.

Figure 8:
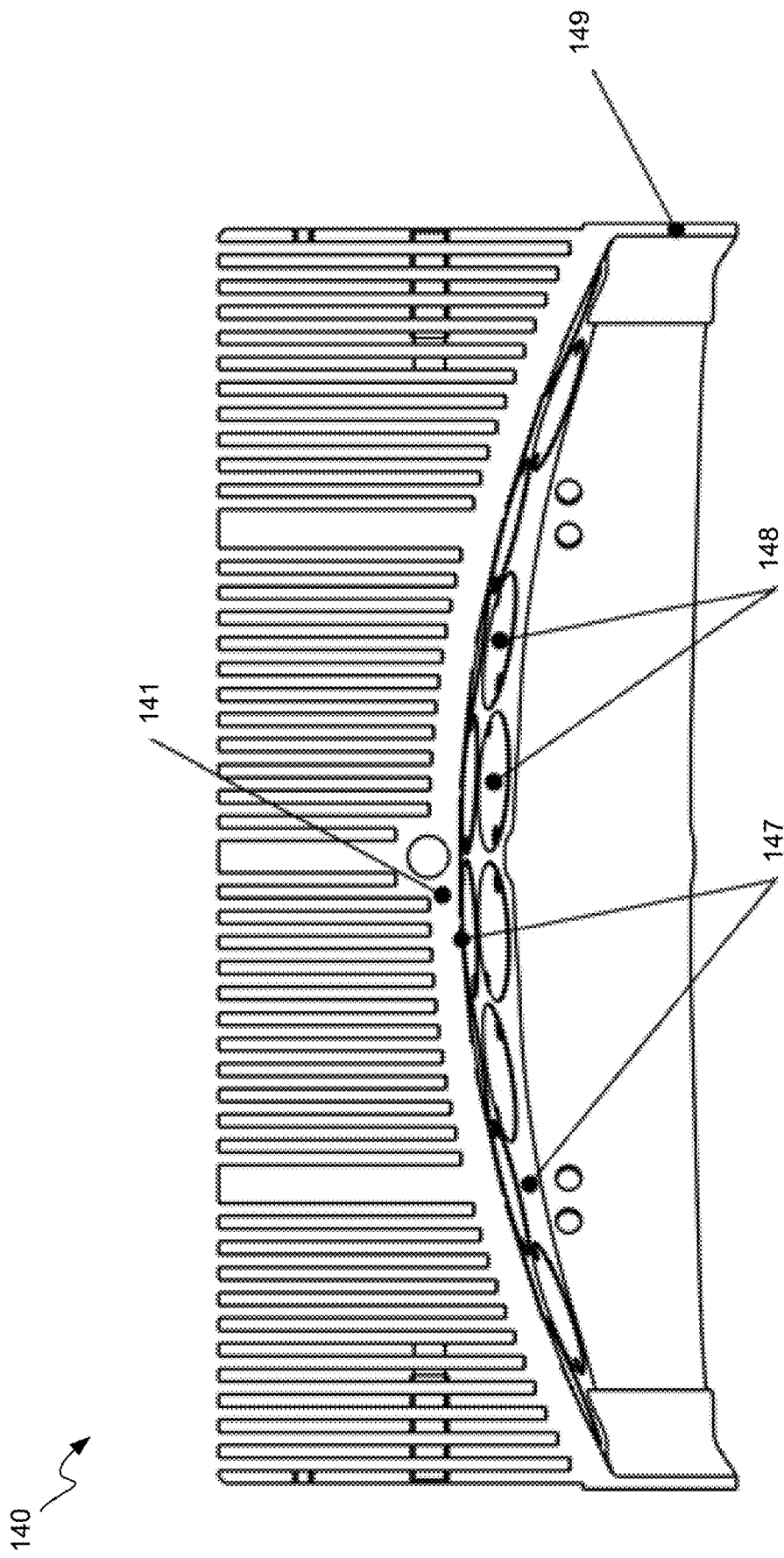
FIG. 8 illustrates in rear cross-section view an example curved surface of a curing system according to one embodiment of the present disclosure.

Again, using a curved surface to orient and mount the curing sources is just one of many ways to focus the curing energy of the curing sources to a given focal region. FIG. 8 illustrates in rear cross-section view one example of such a curved surface for a curing system. In various embodiments, curved surface 147 can be spherical with a radius of curvature of about 200 mm, such that UV light (i.e., curing energy) from all UV LEDs (i.e., curing sources) is directed to the same point at the center of the sphere, which is 200 mm away from each LED. One or more seats 148 may be presented on the curved surface 147, which seats may form a flat region suitable for mounting an LED. The thickness of curved surface 147 thickness may vary from about 1-50 mm in some arrangements. In some embodiments up to 42 flat seats 148 may be used to mount the up to 42 UV LEDs shown in the arrangement of overall curing system 140. In some arrangements, a border 149 can extend down from an outer region of outer housing 141.

Figure 9:
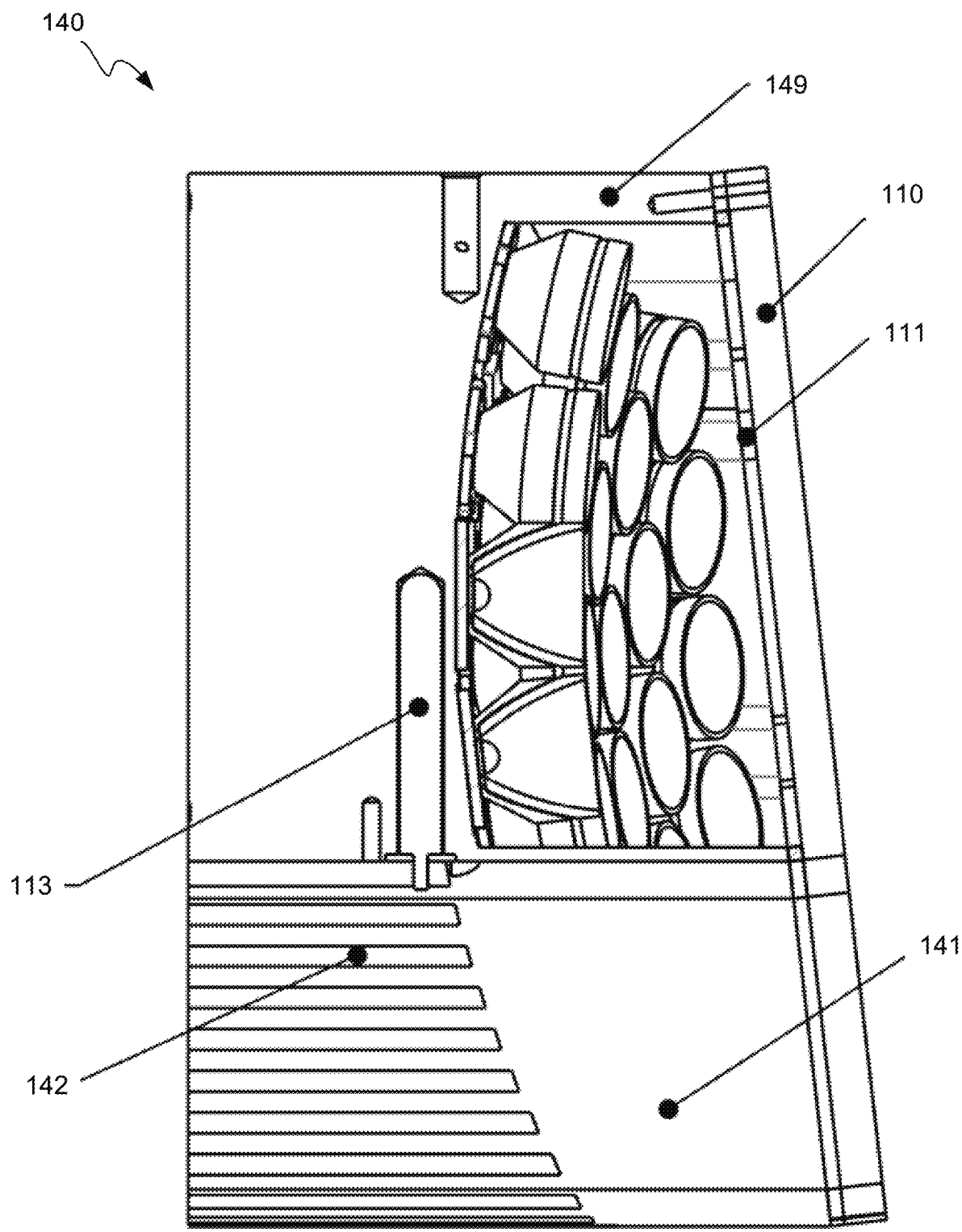
FIG. 9 illustrates in side cross-section view the example curing system of FIG. 5 according to one embodiment of the present disclosure.

Continuing with FIG. 9, various further components of the example curing system of FIG. 5 are illustrated in cutaway side cross-section view. Curing system 140 can include a border 149 that extends away from outer housing 141 around the circumference of the outer housing 141. Border 149 can have a height from 2-50 mm, for example, and can be used to support a cover glass 110. Cover glass 110 can be transparent or translucent to facilitate the transmission of high intensity curing light device radiation from the various UV LEDs contained within curing system 140 and can fully cover all LEDs to protect against dust. A gasket 111 can be used to facilitate a sealed coupling between the cover glass 110 and border 149.

As will be readily appreciated, the lifetime of many curing sources, such as UV LEDs, for example, decreases dramatically when operating at elevated temperature. As such, a cooling system can be used to remove heat from the curing sources to prolong their lifetimes. Various cooling components for curing system 140 can include one or more heatsinks 142, fans (not shown), and thermal sensors 113, among other possible components. Heatsink 142 and outer housing 141 may be joined through a thermal conductive layer formed by one or more materials having favorable thermal conductivity, such as, for example, thermal pastes, glues, liquid metals, or the like. In some arrangements, heatsink 142 and outer housing 141 may be integrally formed, such as where heatsink 142 is part of outer housing 141.

One or more fans may be placed atop heatsink 142, such as that which is shown in FIG. 5. Such fans may be connected to heatsink 142 directly or through a base plate, such as where the base plate is coupled to both the fans and the heatsink. At least one temperature or thermal sensor 113 can be placed next to or inside outer housing 141 or heatsink 142 through the thermal conductive layer formed by one or more materials having good thermal conductivity, as noted above. Thermal sensor 113 can allow for temperature monitoring while operating the high intensity curing system 140 during a continuous printing and curing process.

Figure 10:
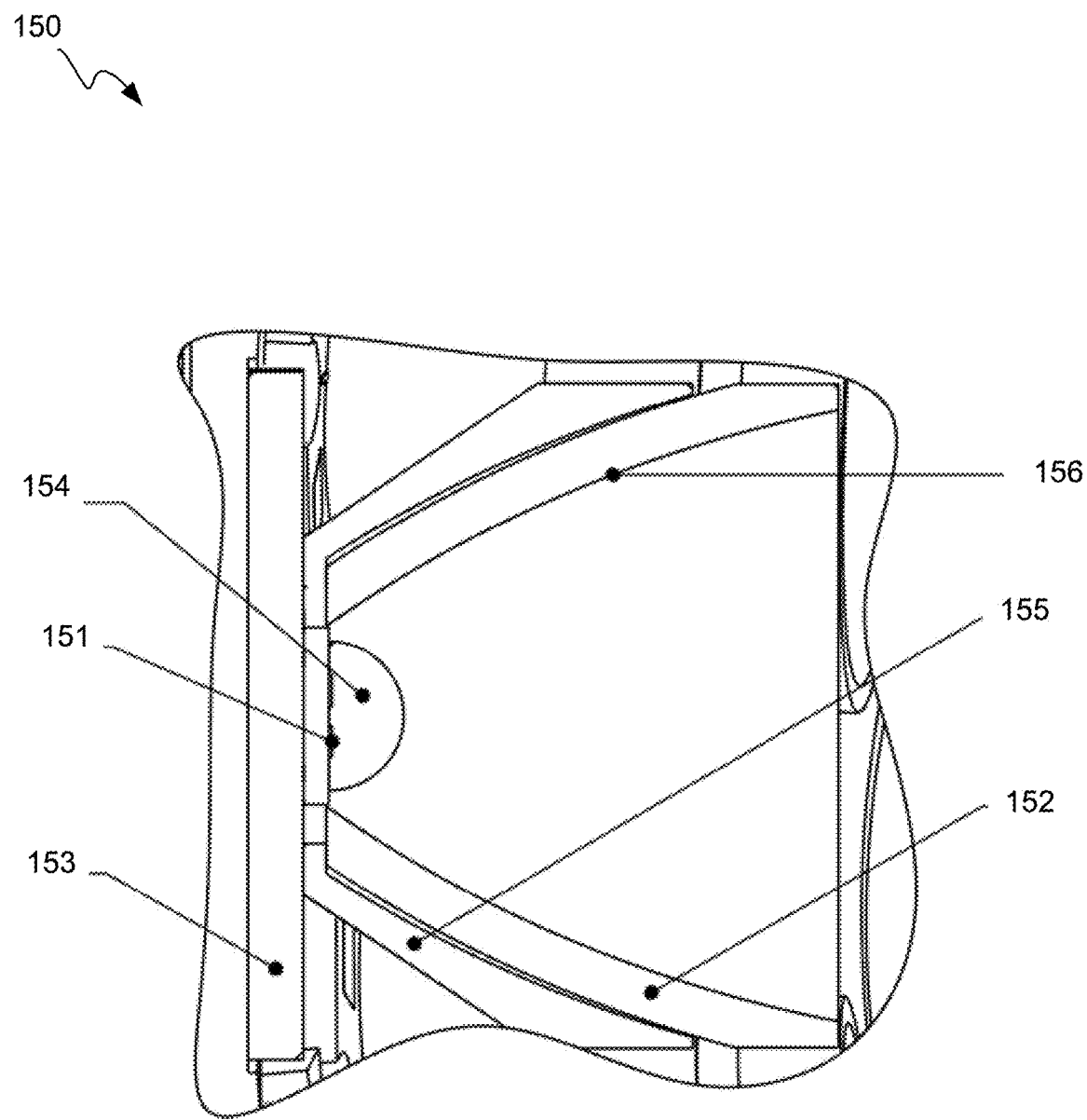
FIG. 10 illustrates in side cross-section view an example light source and associated focusing element of a curing system according to one embodiment of the present disclosure.

FIG. 10 illustrates in side cross-section view an example light source and associated focusing element of a curing system according to one embodiment of the present disclosure. As noted above, the disclosed curing system can include a plurality of curing sources, such as UV LEDs, for example. Each UV LED 150 can include at least one light emission source 151 and at least one light focusing optical element 152. Each light emission source 151 may emit light with a wavelength from about 200-1000 nm, for example, depending on solidification characteristics of the light-activated material used in the 3D printing operations. The wavelength(s) used can depend on the photoinitiating 3D printing materials used. For example, UV photoinitiating printing materials (e.g., benzophenone) can be cured with wavelengths of about 200-250 nm, UV-visible photoinitiating printing materials (e.g., 2,4,6-trimethylbenzoyl-diphenylphosphine oxide) can be cured with wavelengths of about 320-410 nm, and IR photoinitiating printing materials (e.g., IR-140 borate/4-dppba/Ar2I+PF6−) can be cured with wavelengths of about 750-850 nm. In various embodiments then, wavelengths of about 410-420 nm, 400-410 nm, or 390-400 nm can be used to provide a high curing rate for various acrylic monomers.

Each light emission source 151 can thus be a photoelectric device that generates light of a predetermined wavelength based on the nature of 3D printed material previously described. In various embodiments, light emission source 151 may include one or more semiconductor LED chips, such as up to 25 chips, which can be installed to a package body having a total light power per light emission source from about 0.5-40 W. In one particular non-limiting example for purposes of illustration, each light emission source 151 can include four chips for a total light power of about 4.3 W, and a total of 42 light emission sources 151 can be used in the overall curing system for a total power of about 200 W.

Each light emission source 151 can be mounted to a substrate 153, such as, for example, a metal core printed circuit board ("MCPCB"), a flexible printed circuit board, any suitable organic resin material, such as epoxy, silicone, or the like, or any suitable ceramic material, such as $Al_2O_3$ or the like. Each light emission source 151 can have a dome lens 154 on a top surface thereof, which dome lens can be made of transparent or translucent material for the emission of light, with a refractive index different than 1. Dome lens 154 can be formed from, for example, silicone, glass, or other suitable light transmissive materials.

Light focusing element 152 can be coupled to each light emission source 151 directly or indirectly by way of a holder 155 to the substrate 153 or the outer housing of the overall curing system. Light focusing element 152 can be a curved reflector, which curvature can be parabolic, elliptical, or spherical, or an aspherical lens, total internal reflection lens, fresnel lens, gradient-index lens or any other component suitable for focusing light emitted from the light emission source 151. Light focusing element 152 can also include a mirror layer 156 at an interior surface thereof in order to focus light better toward an external focal region.

Figure 11A:
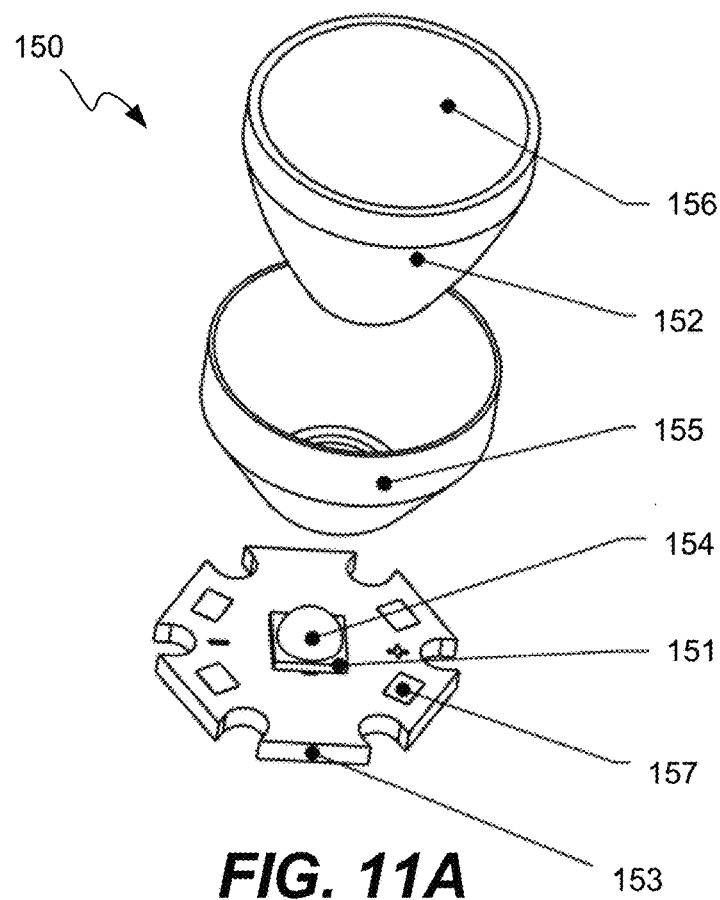
FIG. 11A illustrates in exploded perspective view the example light source and associated focusing element of FIG. 10 according to one embodiment of the present disclosure.
Figure 11B:
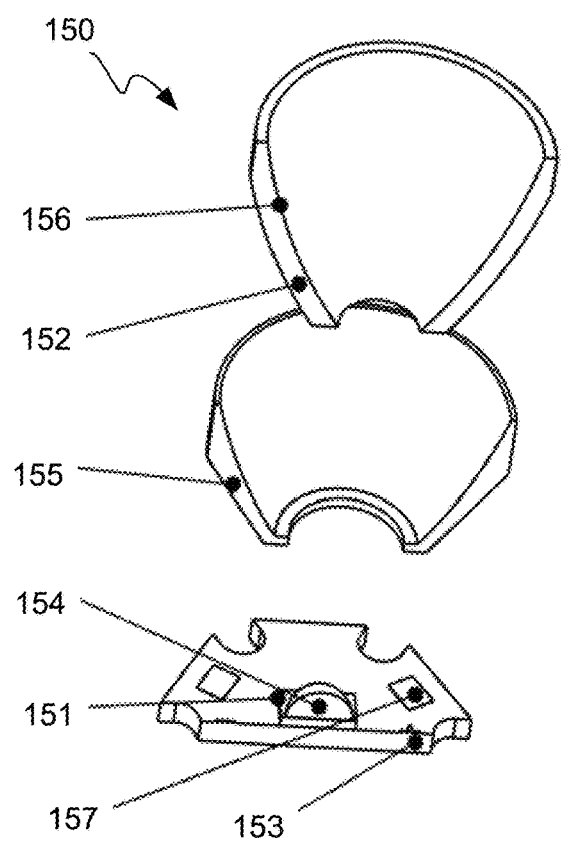
FIG. 11B illustrates in exploded perspective and partially cutaway view the example light source and associated focusing element of FIG. 10 according to one embodiment of the present disclosure.

Continuing with FIGS. 11A and 11B the example light source and associated focusing element of FIG. 10 are shown in exploded perspective and exploded perspective and partially cutaway views respectively. Again, each light emission source 151 can be mounted on a substrate 153, which substrate can have at least two contact areas 157 for soldering power supply wires. In various embodiment, the light emission sources 151 can have power supplied by one or several drivers, all together or separated into several independent groups. Light emission sources 151 can be LEDs, which are set on MCPCBs or other substrates 153, which in turn are connected by wires soldered to contact areas 157 of the MCPCBs or other substrates. Using a substrate 153 enables the easy LED installation and efficient heat removal from LEDs.

Figure 12:
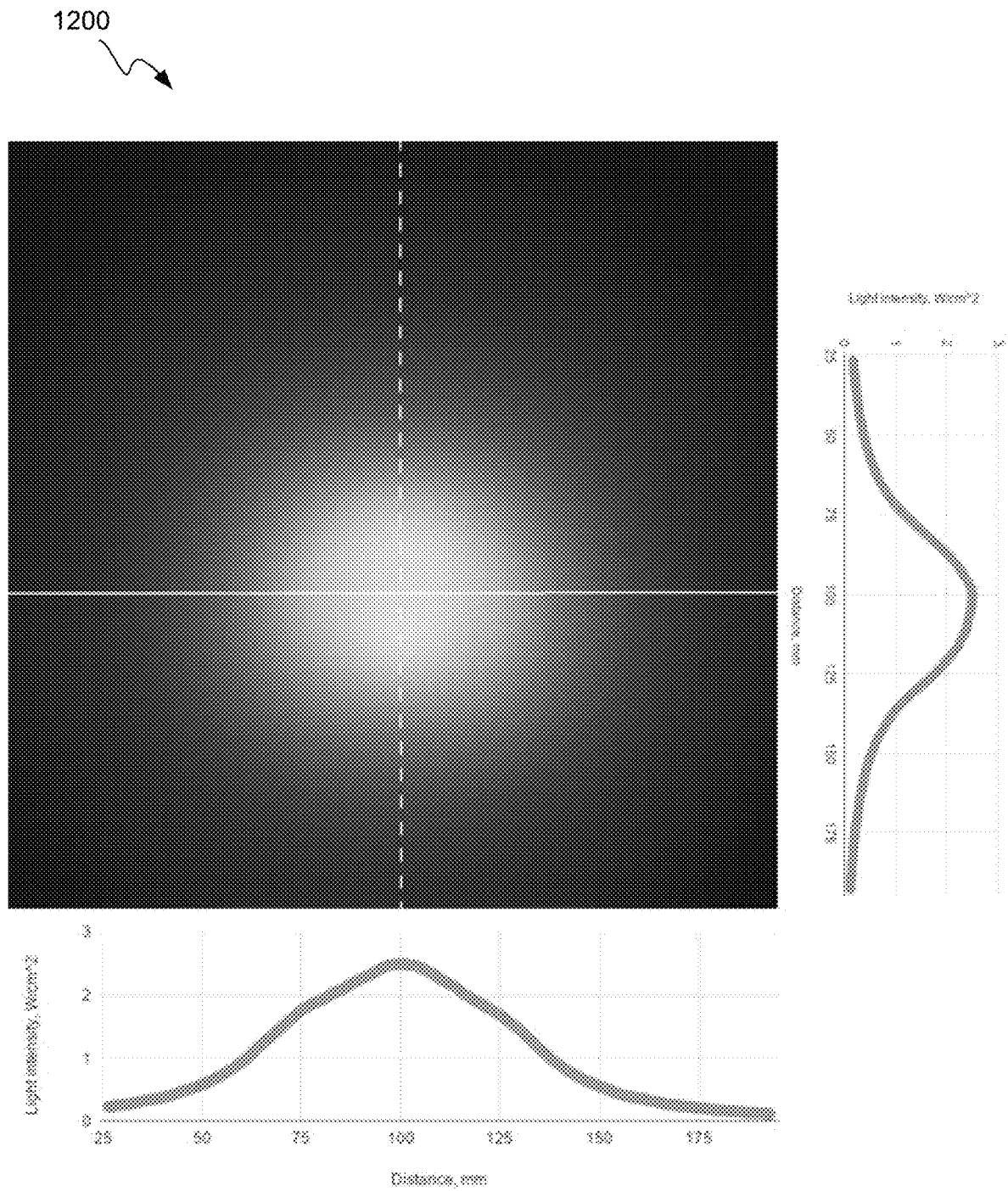
FIG. 12 illustrates graphs of the light distribution and intensity of the curing system of FIG. 5 according to one embodiment of the present disclosure.

Turning next to FIG. 12, graphs of an example light distribution and intensity of the curing system of FIG. 5 are provided. Light spot 1200 represents an observed light distribution of the curing system disclosed above, and graphs along the X and Y axes show its light intensity distribution on a printing surface around a designated focal region. Each of the individual curing sources (e.g., 42 separate UV LEDs) can be about 200 mm from the printing surface, for example. The highest light intensity at the center of the focal region can be about 2.5 $W/cm^2$ and the total light power can be about 200 W. This two-dimensional light intensity distribution can be obtained by using a large beam profiling system having a screen, digital camera, and software for a full intensity distribution analysis. Vertical and horizontal lines illustrate a cross-section of the light distribution corresponding to the graphs placed to the right and bottom of the two-dimensional distribution. Total light distribution can form a light spot 1200 with a diameter of about 70 mm, which can correspond to a width of the printing material. Light spot 1200 can be formed by light from the disclosed curing system and can be projected on a layer of printing material around the focal region. In various embodiments, light spot 1200 (i.e., the focal region) can be placed at or just after the nozzle for immediate curing of the printing material.

Figure 13:
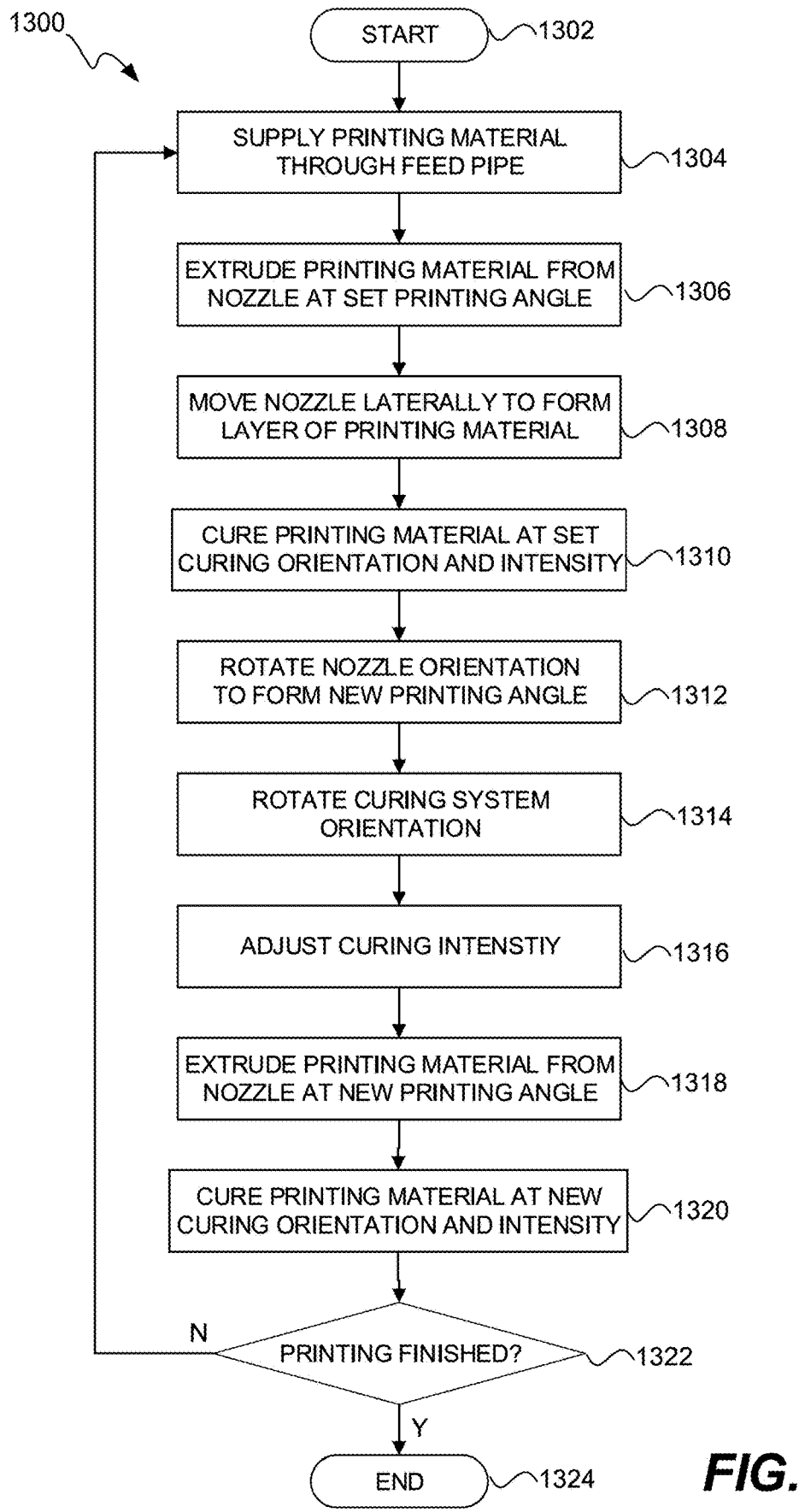
FIG. 13 illustrates a flowchart of an example detailed method of 3D printing a building component involving an adjustable high intensity light curing system according to one embodiment of the present disclosure.

Lastly, FIG. 13 illustrates a flowchart of an example detailed method of 3D printing a building component involving an adjustable printing angle, a light curing system, and a feedback system. Method 1300 can be a detailed version of method 300 set forth above, with various steps and details being interchangeable and/or removable from one or both methods. As in the foregoing method 300, various steps of method 1300 can be performed in different orders and/or simultaneously, such as during a continuous 3D printing and curing process. Furthermore, some or all steps may be repeated as desired until printing of a given 3D printed building component or other object is finished.

After a start step 1302, a first process step 1304 can involve supplying a printing material through a feed pipe. The printing material can come from a printing material source located outside the printing head in an overall printing system, and the feed pipe can be a segmented feed pipe with at least a first segment and a replaceable second segment.

At a subsequent process step 1306, printing material can be extruded from a nozzle at a set printing angle. The nozzle can be coupled directly to the feed pipe, and the set printing angle can be anywhere from 0 to 180 degrees with respect to a surface of a layer being printed.

At the next process step 1308, the nozzle can be moved laterally to form a layer of printing material. This can involve movement of the printing head, to which the nozzle is mounted or otherwise coupled, such that moving the printing head moves the nozzle. Movement of the printing head can also simultaneously move the curing system, which can be form a C-shape centered about the nozzle. Movement can be in or more of the XY, YZ, and XZ planes alone or in any combination.

At the next process step 1310, the extruded printing material can be cured with a curing system at a set rotational orientation of the curing system. Again, this can involve optical curing, heat curing, or any other suitable printing material curing technique. In various arrangements, the printing material can be cured by UV light shortly after it is extruded from the nozzle. For example, a curing system can be arranged at the printing head such that it follows the nozzle and cures printing material right after the printing material is extruded from the nozzle. A protective skirt at the nozzle can prevent the curing of printing material on the nozzle itself, such that curing only takes place immediately after the nozzle has moved away from the freshly extruded printing material.

At the next process step 1312, the nozzle orientation can be rotated to form a new printing angle. This can result in altering the printing angle at which the printing material is extruded from the nozzle. Altering the printing angle in this manner can then allow for further printing of extruded printing material at a different angle than the set printing angle.

At the next process step 1314, the curing system orientation can be rotated to form a new rotational orientation of the curing system. This can be done to create clearance and avoid objects, such as the 3D object being printed, other associated objects such as a building support or foundation for a 3D building component being printed, or other components of the overall 3D printing system. The curing system rotational orientation can be altered similarly with the nozzle angle orientation, or can be altered independently, such as by way of a separate drive.

At the next process step 1316, the curing system intensity can be adjusted to provide a new curing intensity. This can involve increasing or decreasing a light curing intensity, such as from a plurality of UV LEDs or other light sources arranged to cure a photopolymerizable printing material. Again, the light curing intensity can range from 0.1 to 10 W/cm$^2$, although other curing intensity values are also possible. In alternative curing arrangements, this can involve adjusting the curing intensity of the curing medium, such as, for example, heat.

At the next process step 1318, printing material can be extruded from the nozzle at the new printing angle. The new printing angle can also be anywhere from 0 to 180 degrees with respect to a surface of a layer being printed and can be different than the previous printing angle.

At the next process step 1320, the extruded printing material can be cured at the new rotational orientation of the curing system and the new curing intensity. For example, accounting for a complex curved region of a building component may call for an adjustment to the printing angle to account for the curvature, and the complexities or curvature of the curved region may call for rotating the curing system to a new rotational orientation in order to provide clearance for the curing system as the entire printing head moves during printing.

At subsequent decision step 1322, an inquiry can be made as to whether the 3D printing process is finished. If not, then the method can revert to process step 1304 and all steps can be repeated, with the new printing angle becoming the set printing angle, the new rotational orientation of the curing system becoming the set curing orientation, and the new curing intensity becoming the set curing intensity. If the printing process is finished at decision step 1322, however, then the method ends at end step 1324.

Again, all steps can be performed simultaneously and in automated fashion, such that curing takes place on previously extruded printing material while new printing material continues to be extruded from the nozzle. Continuing the process can also allow for continuous printing before, during, and after the nozzle orientation has been rotated and the curing system orientation has been rotated.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A three-dimensional ("3D") printing system, comprising:
    an extruding system including a feed pipe coupled to a printing material source and a nozzle coupled to the feed pipe, wherein the nozzle extrudes a printed material at a nozzle outlet during a printing process;
    a curing system that cures the printed material after the printed material has been extruded from the nozzle outlet, the curing system including a plurality of curing sources coupled to a mounting arrangement having a spherical surface, wherein the plurality of curing sources combine to emit a total curing energy toward a focal region located proximate the nozzle outlet, and wherein each of the plurality of curing sources is affixed to the spherical surface such that curing energy from each curing source is directed toward the focal region, wherein the curing system further includes an outer housing coupled to the spherical surface and surrounding the outer sides of the plurality of curing sources; and a feedback system including at least a processor and one or more sensors, wherein the feedback system is configured to detect the location of the curing system with respect to at least a portion of a 3D printed object during the printing process.

2. The 3D printing system of claim 1, wherein the 3D printing system is configured to use location data provided by the feedback system to prevent the curing system from colliding with the 3D printed object or any other object during the printing process.

3. The 3D printing system of claim 1, wherein the feedback system further includes a camera configured to provide an image of the 3D printed object within the focal region.

4. The 3D printing system of claim 1, wherein the feedback system further includes a thermal imaging camera configured to provide a temperature distribution image of the 3D printed object within the focal region.

5. The 3D printing system of claim 1, wherein each of the plurality of curing sources is positioned at a different angle with respect to the focal region.

6. The 3D printing system of claim 1, wherein the plurality of curing sources includes at least 40 curing sources.

7. The 3D printing system of claim 6, wherein the overall dimensions of the curing system are within 250 mm×180 mm×140 mm.

8. The 3D printing system of claim 1, wherein the curing energy is light and the plurality of curing sources are light emitting diodes.

9. The 3D printing system of claim 1, wherein the intensity of at least a portion of the curing sources is adjustable.

10. The 3D printing system of claim 1, wherein the outer housing forms a C-shape around a central axis that extends through the focal region.

11. The 3D printing system of claim 10, wherein the curing system is configured to rotate about the central axis during the printing process to improve curing of the extruded printing material based on a movement direction of the 3D printing system.

12. The 3D printing system of claim 1, wherein the curing system further includes a cooling system including a heat sink, one or more fans, or both.

13. The 3D printing system of claim 1, wherein the feedback system further includes a temperature sensor configured to monitor the temperature of the curing system.

14. The 3D printing system of claim 1, wherein the size of the focal region is about the same as the size of an extrusion width of the printed material.

15. A curing system configured to cure extruded printed material during a three-dimensional ("3D") printing process, the curing system comprising:

an outer housing coupled to a spherical surface and surrounding the outer sides of a plurality of curing sources;

a mounting arrangement located within and coupled to a rear portion of the outer housing, wherein the mounting arrangement includes the spherical surface; and the plurality of curing sources contained laterally within the outer housing with each of the plurality of curing sources being affixed to the spherical surface of the mounting arrangement such that each of the plurality of curing sources is angled toward a focal region located proximate a nozzle of an overall 3D printing system, wherein the plurality of curing sources combine to emit a total curing energy toward the focal region.

16. The curing system of claim 15, wherein the curing energy is light and the plurality of curing sources are light emitting diodes.

17. The curing system of claim 15, wherein the outer housing forms a C-shape around a central axis that extends through the focal region.

18. The curing system of claim 17, wherein the curing system is configured to rotate about the central axis during the 3D printing process.

19. The curing system of claim 18, wherein the curing system is configured to have its rotational movement controlled by the overall 3D printing system based on its relative location with respect to a 3D printed object being printed by the overall 3D printing system in order to prevent collisions between the curing system and any other object.

20. The curing system of claim 15, wherein the curing system further includes:
a cooling system including a heat sink, one or more fans, or both.

21. The curing system of claim 15, wherein the spherical surface extends laterally within the outer housing to an outer circumference of the outer housing.

22. The curing system of claim 15, further including:
a border that extends away from the outer housing around a lateral circumference of the outer housing, wherein the spherical surface extends laterally within the outer housing to all regions of the border.

23. The curing system of claim 15, wherein the mounting arrangement further includes a plurality of seats distributed across the spherical surface, each of the plurality of seats forming a flat surface configured to mount a rear portion of one of the plurality of curing sources thereto.

24. The curing system of claim 15, wherein the plurality of curing sources are arranged along the spherical surface in a pattern having at least four rows and at least eight columns.

25. A curing system configured to cure extruded printed material during a three-dimensional ("3D") printing process, the curing system comprising:

an outer housing, wherein the outer housing forms a C-shape around a central axis that extends through a focal region located proximate a nozzle of an overall 3D printing system such that the entire outer housing is located on one side of the central axis while none of the outer housing is located on an opposite side of the central axis regardless of the rotational orientation of the curing system about the central axis;

a mounting arrangement located within and coupled to a rear portion of the outer housing, wherein the mounting arrangement includes a curved surface; and a plurality of curing sources contained laterally within the outer housing with each of the plurality of curing sources being coupled to the curved surface of the mounting arrangement such that each of the plurality of curing sources is angled toward the focal region, wherein the plurality of curing sources combine to emit a total curing energy toward the focal region, wherein the curing system is configured to rotate about the central axis during the 3D printing process, and wherein the curing system is configured to have its rotational movement controlled by the overall 3D printing system based on its relative location with respect to a 3D printed object being printed by the overall 3D printing system in order to prevent collisions between the curing system and any other object.

* * * * *